(12) United States Patent
Lee

(10) Patent No.: US 7,931,011 B2
(45) Date of Patent: Apr. 26, 2011

(54) HIGH-PRESSURE FUEL SUPPLY CIRCUIT

(75) Inventor: Bong Sang Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/512,795

(22) Filed: Jul. 30, 2009

(65) Prior Publication Data

US 2010/0050994 A1 Mar. 4, 2010

(30) Foreign Application Priority Data

Sep. 4, 2008 (KR) .................. 10-2008-0087320

(51) Int. Cl.
*F02M 37/00* (2006.01)
*F02M 37/20* (2006.01)

(52) U.S. Cl. ........................... 123/514; 123/516

(58) Field of Classification Search .................. 123/510, 123/511, 514, 516, 461; 417/435
See application file for complete search history.

(56) References Cited

U.S. PATENT DOCUMENTS

| | | | | |
|---|---|---|---|---|
| 3,627,450 A * | 12/1971 | Ward | ................... | 417/205 |
| 3,789,819 A * | 2/1974 | Moulds | ................... | 123/516 |
| 3,888,274 A * | 6/1975 | Weston | ................... | 137/174 |
| 4,409,930 A * | 10/1983 | Bury et al. | ................... | 123/514 |
| 4,450,820 A * | 5/1984 | Haynes | ................... | 123/514 |
| 4,478,197 A * | 10/1984 | Yasuhara et al. | ................... | 123/514 |
| 4,502,451 A * | 3/1985 | Duprez | ................... | 123/516 |
| 4,543,938 A * | 10/1985 | Szlaga | ................... | 123/514 |
| 4,569,637 A * | 2/1986 | Tuckey | ................... | 417/360 |
| 4,589,395 A * | 5/1986 | Timms et al. | ................... | 123/516 |
| 4,602,605 A * | 7/1986 | Adkins | ................... | 123/516 |
| 4,625,701 A * | 12/1986 | Bartlett et al. | ................... | 123/514 |
| 4,732,131 A * | 3/1988 | Hensel | ................... | 123/516 |
| 4,856,483 A * | 8/1989 | Beavis et al. | ................... | 123/516 |
| 4,876,993 A * | 10/1989 | Slattery | ................... | 123/73 AD |
| 5,039,284 A * | 8/1991 | Talaski | ................... | 417/366 |
| 5,085,198 A * | 2/1992 | Bartlett et al. | ................... | 123/510 |
| 5,119,790 A * | 6/1992 | Olson | ................... | 123/516 |
| 5,137,002 A * | 8/1992 | Mahoney et al. | ................... | 123/516 |
| 5,263,459 A * | 11/1993 | Talaski | ................... | 123/516 |
| 5,269,276 A * | 12/1993 | Brown | ................... | 123/514 |
| 5,655,892 A * | 8/1997 | Cherniawski et al. | ................... | 417/292 |
| 5,746,184 A * | 5/1998 | Ekstam | ................... | 123/510 |
| 5,823,169 A * | 10/1998 | Strohl et al. | ................... | 123/516 |
| 6,289,879 B1* | 9/2001 | Clausen et al. | ................... | 123/516 |
| 6,361,286 B1* | 3/2002 | Takahashi et al. | ................... | 417/269 |
| 6,527,603 B1* | 3/2003 | Wickman et al. | ................... | 440/88 F |
| 6,527,947 B1* | 3/2003 | Channing et al. | ................... | 210/136 |

(Continued)

FOREIGN PATENT DOCUMENTS

JP 2006-207510 A 8/2006

(Continued)

*Primary Examiner* — Thomas N Moulis
(74) *Attorney, Agent, or Firm* — Morgan, Lewis & Bockius LLP

(57) ABSTRACT

A high-pressure fuel supply circuit, which supplies fuel in a fuel tank to injectors of an internal combustion engine, may includes a fuel pump that is employed so as to feed the fuel in the fuel tank with pressure to the injector, wherein one or more fuel pumps may be employed so as to improve a compression ratio of the fuel; a separator provided with a selective check valve so as to separate air from the fuel supplied by the fuel pump; and an injection pump receiving the fuel from the separator, compressing it, and feeding it with pressure to the injector.

8 Claims, 2 Drawing Sheets

U.S. PATENT DOCUMENTS

| | | | |
|---|---|---|---|
| 6,581,579 B1 * | 6/2003 | Knight et al. | 123/516 |
| 6,622,709 B2 * | 9/2003 | Miller et al. | 123/516 |
| 6,694,955 B1 * | 2/2004 | Griffiths et al. | 123/516 |
| 6,701,900 B1 * | 3/2004 | Millar et al. | 123/516 |
| 6,739,318 B2 * | 5/2004 | Nomura | 123/461 |
| 6,918,380 B2 * | 7/2005 | Nomura | 123/495 |
| 7,025,048 B2 | 4/2006 | Ekstam | |
| 7,503,314 B2 * | 3/2009 | Achor | 123/509 |
| 7,713,335 B2 * | 5/2010 | Ringenberger et al. | 95/261 |
| 7,779,818 B2 * | 8/2010 | Wilson et al. | 123/514 |
| 2002/0083923 A1 * | 7/2002 | Suzuki et al. | 123/464 |
| 2002/0189589 A1 * | 12/2002 | Kato et al. | 123/458 |
| 2004/0237943 A1 * | 12/2004 | Krishnamoorthy et al. | 123/516 |
| 2004/0261769 A1 * | 12/2004 | Kuroda | 123/458 |

FOREIGN PATENT DOCUMENTS

KR    10-0444054 B1    8/2004

* cited by examiner

HIGH-PRESSURE FUEL SUPPLY CIRCUIT

CROSS-REFERENCE TO RELATED APPLICATION

The present application claims priority to Korean Patent Application Number 10-2008-0087320 filed Sep. 4, 2008, the entire contents of which application is incorporated herein for all purposes by this reference.

BACKGROUND OF THE INVENTION

1. Field of the Invention

The present invention relates to a high-pressure fuel supply circuit, and more particularly to a high-pressure fuel supply circuit that is capable of cutting off inflow of air by a selective check valve provided therein.

2. Description of the Related Art

Generally, a fuel pump of a gasoline direct injection (GDI) engine pressurizes a fuel supplied from a fuel tank through a fuel line and injects it into a combustion chamber such that a predetermined amount of the fuel is supplied uniformly to each cylinder with desirable fuel injection timing according to a change of engine load or engine speed.

That is, foreign materials mixed in the fuel are filtered by a fuel filter, and the filtered fuel is drawn and is injected to the combustion chamber by the injector.

In this case, since the distance between a fuel tank of a vehicle provided with the GDI engine and the injector is too far, most vehicles are provided with an additional priming pump so as to remove air from the fuel line.

Air in the fuel line causes problems in fuel supply during start-up, and an error occurs in fuel pressure control and injection timing that causes deterioration of startability and drivability. Therefore, it is required to exhaust air from the fuel.

In addition, since air is compressible, it causes a sponge phenomenon that causes deterioration of high-pressure fuel injection and forming of a proper pressure.

As can be seen from the foregoing, when the air is compressed the pressure thereof becomes low, and thereby deterioration of fuel injection and the sponge phenomenon occur.

When using a vehicle as mentioned above, deterioration of starting and acceleration occurs, and the problem is more severe in a GDI engine in which gasoline is injected at a higher pressure than in a standard gasoline engine.

Meanwhile, since the GDI engine vehicle according to the prior art provided with the priming pump should be controlled manually, a driver should directly detect whether air flows in the line between the fuel tank and the injector, and thereby it is limited for a driver to detect the problem of the vehicle precisely.

Further, since the priming pump operates in such a manner that a cylinder and a priming pump are assembled by a screw, air-tightness or performance of pumping is not reliable.

Therefore, the driver should directly operate the priming pump, which causes inconvenience to a driver, and when air flows in the line between the fuel tank and the injection pump and the driver does not realize this so does not operate the priming pump manually, the deterioration of starting and acceleration occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a high-pressure fuel supply circuit having advantages of improving startability and acceleration of an engine as well as reliability by using a selective check valve that is employed so as to automatically separate air mixed in a fuel, and thereby provides convenience for a driver.

Various aspects of the present invention also provides for a high-pressure fuel supply circuit having advantages of reducing an effort of operating it manually.

A high-pressure fuel supply circuit according to an exemplary embodiment of the present invention, which supplies fuel in a fuel tank to injectors of an internal combustion engine, may includes a fuel pump that is employed so as to feed the fuel in the fuel tank with pressure to the injector, wherein one or more fuel pumps may be employed so as to improve a compression ratio of the fuel; a separator provided with a selective check valve so as to separate air from the fuel supplied by the fuel pump; and an injection pump receiving the fuel from the separator, compressing it, and feeding it with pressure to the injector.

The air separator is partitioned by an air collection compartment storing air separated from a fuel and by a fuel collection compartment storing the fuel, and a selective check valve is interposed between the air collection compartment and the fuel collection compartment.

The selective check valve passes only low density fluid and not high density fluid. The exhaust line is communicated to the air collection compartment so as to exhaust the air separated from the fuel.

As mentioned above, a high-pressure fuel supply circuit according to an exemplary of the present invention improves startability and acceleration of an engine by a selective check valve that automatically separates air from fuel.

In addition, the high-pressure fuel supply circuit according to an exemplary of the present invention reduces effort of operating it manually.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
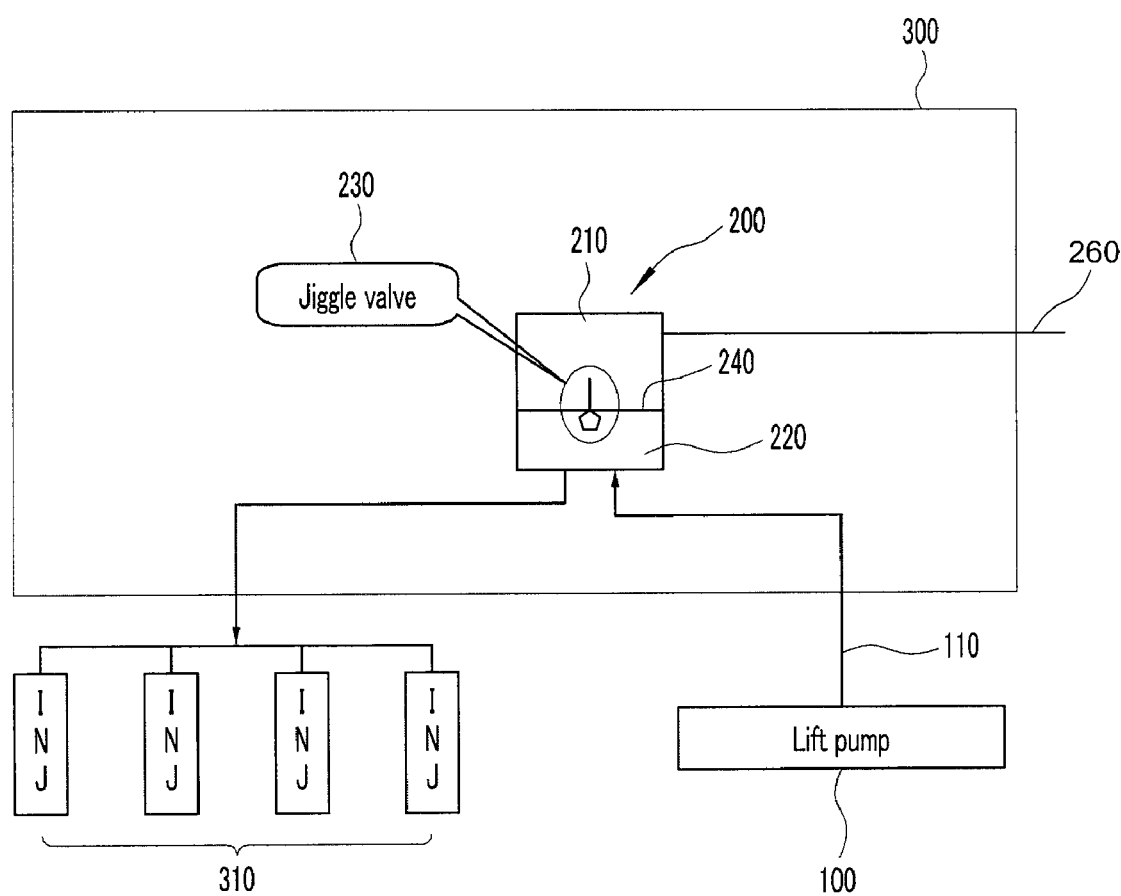
FIG. 1 is a schematic flow chart showing an exemplary high-pressure fuel supply circuit according to the present invention.
Figure 2:
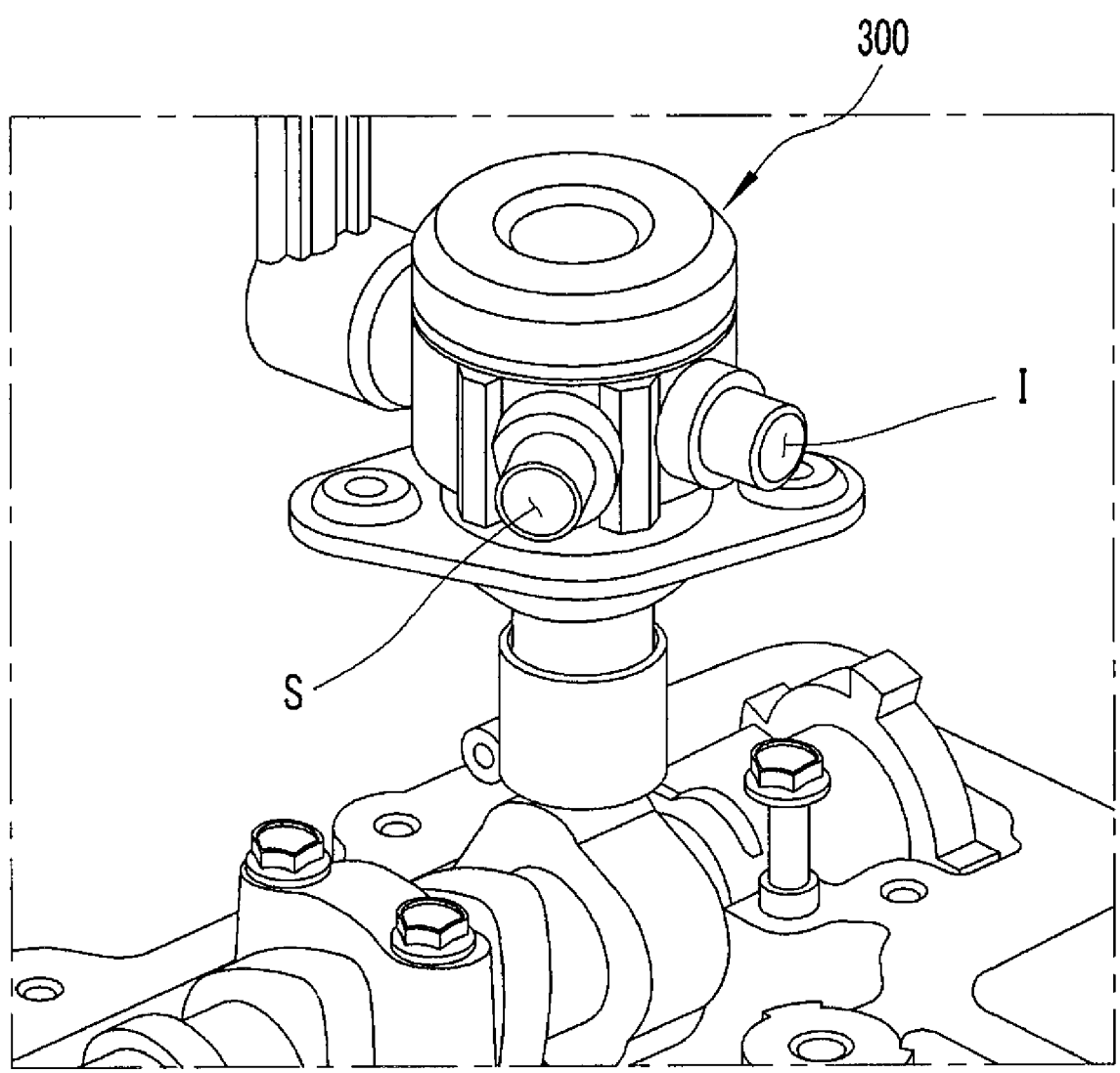
FIG. 2 is a perspective view showing such a state in which an exemplary high-pressure fuel supply circuit according to the present invention is employed.

FIG. 1 is a schematic flow chart showing a high-pressure fuel supply circuit according to various embodiments of the present invention, and FIG. 2 is a perspective view showing a state in which a high-pressure fuel supply circuit according to various embodiments of the present invention is employed.

Referring to FIG. 1, a high-pressure fuel supply pump includes a lift pump 100, a separator 200, and an injection pump 300.

Herein, the lift pump 100 forcedly feeds a fuel stored in a fuel tank to the separator 200.

The fuel that is forcedly fed from the fuel tank may pass through a fuel filter so as to filter foreign materials mixed in the fuel.

After the fuel is passed through such a fuel filter, it is forcedly fed to the separator 200.

The separator 200 is disposed inside the injection pump 300, and the inside of the separator 200 is partitioned into an air collection compartment 210 and a fuel collection compartment 220 by a partition 240, and a selective check valve 230 is interposed between the air collection compartment 210 and the fuel collection compartment 220.

Herein, the selective check valve 230 may be a valve that passes only low density fluid and not high density fluid.

As technical structures of the selective check valve 230 are well known to a person of ordinary skill in the art, a detailed description thereof will be omitted.

The lift pump 100 is connected to the fuel collection compartment 220 through an inflow pipe 110 to supply a fuel to the fuel collection compartment 220.

The fuel collection compartment 220 is formed with a predetermined size so as to temporarily store the fuel supplied from the lift pump 100.

Therefore, since the fuel that is forcedly fed to the separator 200 is stored in the fuel collection compartment 220 and only low density fluid can be passed through the selective check valve 230, the air moves to the air collection compartment 210 disposed opposite to the fuel collection compartment 220.

Thus, high-density fuel that is stored in the fuel collection compartment 220 is forcedly fed, and the air is stored in the air collection compartment 210.

Then, the fuel stored in the injection pump 300 is forcedly fed to injectors 310 in a state of being compressed by operation of a supply pump and a control valve.

Additionally, a return pipe can be provided so as to return fuel that is supplied excessively from the injection pump 300 to the injectors 310, through the return pipe.

The technical structures of the supply pump, the control valve, and the return pipe are well known to a person of ordinary skill in the art, and thus a detailed description thereof will be omitted.

Meanwhile, according to various embodiments of the present invention, it is exemplarily described that the separator 200 is mounted in the injection pump 300, but the spirit of the present invention cannot be limited to this and as shown in FIG. 2, a separator can be provided separately before an inflow portion I of the injection pump 300 that is operatively connected to a cylinder head and a camshaft.

That is, the fuel that is forcedly sent from the lift pump 100 is separated from air in the separator 200 and is forcedly fed to the inflow portion I, and the fuel that is separated from the air is compressed in the injection pump 300 and may be forcedly fed to the injectors though a supply portion S.

In addition, an exhaust line 260 may be provided to the air collection compartment so as to exhaust the air separated from a fuel to the exterior.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel supply circuit that supplies fuel in a fuel tank to an injector of an internal combustion engine, comprising:
   at least a fuel pump that is installed so as to feed the fuel in the fuel tank with pressure to the injector so as to improve a compression ratio of the fuel;
   a separator provided with a selective check valve so as to separate fuel vapor from the fuel supplied by the fuel pump; and
   an injection pump receiving the fuel from the separator, compressing it, and feeding the fuel with pressure to the injector;
   wherein the separator is partitioned into an fuel vapor collection compartment storing the fuel vapor separated from the fuel and a fuel collection compartment storing the fuel, and
   wherein the selective check valve is interposed between the fuel vapor collection compartment and the fuel collection compartment to separate the fuel vapor from the fuel.

2. The high-pressure fuel supply circuit of claim 1, wherein the separator is installed in the injection pump.

3. The high-pressure fuel supply circuit of claim 1, wherein the selective check valve passes only low density fluid and not high density fluid.

4. The high-pressure fuel supply circuit of claim 1, wherein an exhaust line is communicated to the fuel vapor collection compartment so as to exhaust the fuel vapor separated from the fuel.

5. A fuel supply circuit that supplies fuel in a fuel tank to an injector of an internal combustion engine, comprising:
   at least a fuel pump that is installed so as to feed the fuel in the fuel tank with pressure to the injector so as to improve a compression ratio of the fuel;
   a separator installed in the injection pump;
   a selective check valve disposed inside the separator so as to separate fuel vapor from the fuel supplied by the fuel pump;
   wherein the separator is partitioned into an fuel vapor collection compartment storing the fuel vapor separated from the fuel and a fuel collection compartment storing the fuel, and
   wherein the selective check valve is interposed between the fuel vapor collection compartment and the fuel collection compartment to separate the fuel vapor from the fuel.

6. The high-pressure fuel supply circuit of claim 5 further comprising an injection pump receiving the fuel from the separator, compressing it, and feeding the fuel with pressure to the injector.

7. The high-pressure fuel supply circuit of claim 5, wherein the selective check valve passes only low density fluid and not high density fluid.

8. The high-pressure fuel supply circuit of claim 5, wherein an exhaust line is communicated to the fuel vapor collection compartment so as to exhaust the air separated from the fuel.

* * * * *